United States Patent [19]

Henning et al.

[11] Patent Number: 5,248,651
[45] Date of Patent: Sep. 28, 1993

[54] PROCESS FOR THE PRODUCTION OF CARBON MOLECULAR SIEVES

[75] Inventors: Klaus D. Henning, Essen; Wolfgang Bongartz, Mönchengladbach; Klaus Wybrands, Bochum; Josef Degel, Hattingen; Karl K. Knoblauch; Alois Ziegler, both of Essen, all of Fed. Rep. of Germany

[73] Assignee: Bergwerksverband GmbH, Essen, Fed. Rep. of Germany

[21] Appl. No.: 859,519

[22] PCT Filed: Sep. 20, 1991

[86] PCT No.: PCT/EP91/01796
§ 371 Date: Jun. 3, 1992
§ 102(e) Date: Jun. 3, 1992

[87] PCT Pub. No.: WO92/05868
PCT Pub. Date: Apr. 16, 1992

[30] Foreign Application Priority Data

Oct. 5, 1990 [DE] Fed. Rep. of Germany ....... 4031580

[51] Int. Cl.$^5$ .................. C01B 31/10; C01B 31/00; B01J 20/20; B01D 53/04
[52] U.S. Cl. .................. 502/432; 264/29.5; 502/416; 502/418; 502/429; 502/437; 95/138
[58] Field of Search ............. 502/432, 416, 418, 437, 502/429

[56] References Cited

U.S. PATENT DOCUMENTS

| 4,880,765 | 11/1989 | Knoblauch et al. | 502/432 |
| 5,043,310 | 8/1991 | Takeuchi et al. | 502/416 |
| 5,098,880 | 3/1992 | Gaffney et al. | 502/437 |

FOREIGN PATENT DOCUMENTS

| 0119924 | 9/1984 | European Pat. Off. |
| 0360247 | 3/1990 | European Pat. Off. |
| 2119829 | 11/1972 | Fed. Rep. of Germany |
| 3618426 | 7/1987 | Fed. Rep. of Germany |

OTHER PUBLICATIONS

Chemical Abstr. vol. 102, No. 20, May 1985 No. 169053, Japan Oxygen Co., Porous Carbon Molecular Sieve, p. 135.

Primary Examiner—Paul E. Konopka
Attorney, Agent, or Firm—Herbert Dubno

[57] ABSTRACT

A process for producing carbon molecular sieves for the separation of oxygen and nitrogen, whereby finely ground hard coal particles are oxidized with air in a fluidized bed, the coal is then formed after the addition of water and binders and carbonized at temperatures of 800°–900° C., subsequently activated with steam at temperatures of 800°–900° C. and the preliminary product of the low-level activation is treated with carbon splitting hydrocarbons. Starches obtained by reacting agglutinized starches with sulphamates are used as binders.

1 Claim, No Drawings

PROCESS FOR THE PRODUCTION OF CARBON MOLECULAR SIEVES

CROSS REFERENCE TO RELATED APPLICATIONS

This application is a National Phase of PCT/EP 91/01796 filed Sep. 20, 1991 and based upon German National application P 4 031 580.0 filed Oct. 5, 1990 under the International Convention.

FIELD OF THE INVENTION

The invention relates to a process for producing carbon molecular sieves. More particularly, the invention relates to a process of this type in which finely ground hard coal particles are oxidized with air in a fluidized bed, the coal is shaped after water and binders have been added, carbonized, activated with steam and treated with carbon splitting hydrocarbons.

BACKGROUND OF THE INVENTION

From German Patent 36 18 426 and the therein mentioned German Patent 21 19 829 it is known to produce carbon molecular sieves for the separation of gases with small molecular size, particularly $O_2$ and $N_2$, in the following manner: finely ground hard coal is oxidized with air in a fluidized bed, after adding binders and water the coal is shaped and carbonized at temperatures up to 900° C., subsequently activated with steam at temperatures of 800°–900° C. and the preliminary product of the low-level activation is treated with carbon splitting hydrocarbons at 750°–850° C.

The carbon molecular sieves produced this way are used for obtaining nitrogen from air in pressure swins processes. The operating costs of alternate pressure processes consist primarily of compression costs for the required air compression. The so-called specific air consumption, i.e. the ratio of the used amounts of air to the produced amount of nitrogen ($m^3$ air/$m^3$ nitrogen) should be as low as possible. This specific air consumption is directly related to the nitrogen adsorptivity of the carbon molecular sieve, which results from the difference between the diffusion rates of nitrogen and oxygen in the carbon molecular sieve.

OBJECT OF THE INVENTION

It is the object of the present invention to produce a carbon molecular sieve with improved oxygen adsorptivity, so that the costs related to energy consumption can be reduced during the separation of nitrogen from air.

DESCRIPTION OF THE INVENTION

This object is achieved by using starches as binding agents. These starches can be obtained by reacting agglutinated starches with sulphamates. These starches are described in EP 0 129 227 B1.

The carbon molecular sieves produced according to the invention have good mechanical strength, comparable to carbon molecular sieves using coaltar pitch as binders. The shock resistance (H. von Kienle, E. Bäder; "Aktivkohle und ihre industrielle Anwendung"—"Activated Carbon and its Industrial Application"—published by F. Enke Verlag, Stuttgart 1980, Page 57) was 90%>0.5 mm., no matter whether coaltar pitch or starch were used for binders.

The oxygen adsorptivity of the carbon molecular sieve with respect to the separation of nitrogen and oxygen is determined by a test method which takes into account the differences in the diffusion rates of nitrogen and oxygen (1-minute test).

An adsorber (capacity 200 ml) filled with carbon molecular sieve to be tested is traversed for the duration of one minute by air supplied by an air pump under a pressure of 1013 mbar. During this time the carbon molecular sieve contained in the adsorber adsorbs gas due to its porous structure, whereby due to its high diffusion ratio the oxygen is preferentially adsorbed before the nitrogen. Most of the nitrogen passes the separating pores and exits the adsorber at the end. After one minute, this process is interrupted and the adsorber is evacuated in counterflow by means of a vacuum pump to 40 mbar. This way an oxygen-enriched gas is obtained, which is fed to a gasometer. The amount of desorbed considered with respect to the volume of the carbon molecular sieve CMS (Relative Volume RV=1 Gas/1 CMS), the maximum oxygen concentration as well as the average oxygen concentration of the desorption gas are measured. Both oxygen concentrations are higher than the oxygen concentration in the air (21% by volume). The resulting relative volume should range between 2.0 and 2.6. When the relative volume decreases, the average oxygen concentration increases.

A measure for the oxygen adsorptivity of a carbon molecular sieve is the height of the average oxygen concentration (at a predetermined RV-value) in the desorption gas of this test. The higher the average oxygen concentration at the same relative volume, the more advantageous is the separation efficiency in the technical pressure swins installation. In the process of obtaining nitrogen from air, a good carbon molecular sieve has to be capable of adsorbing per time unit the largest possible specific amount of oxygen (1 oxygen/1 CMS) during the passage of the air through the carbon molecular sieve bulk, so that an oxygen-poor nitrogen leaves the adsorber.

For the comparative evaluation of carbon molecular sieves reference can be made to the described measured values of the 1-minute test, since the adsorbed oxygen amount can be calculated from the measured values of the relative volume and the average oxygen content. If the 1-minute relative volume is multiplied by the average oxygen concentration, the result obtained is the specific oxygen adsorption of the carbon molecular sieve.

$$\text{Spec. oxygen adsorption (1/1)} = \frac{\text{Relative Volume (1/1)} \times \text{average } O_2 \text{ conc.(\% by vol)}}{100 \text{ (\% by vol.)}}$$

The higher the specific oxygen adsorption (1 $O_2$/1 CMS), the better are the separation characteristics of the carbon molecular sieve.

Within the range of 1 min-relative volumes from 2.0–2.6, the oxygen adsorptivity of the carbon molecular sieve can be evaluated as follows:

| Oxygen Adsorption | CMS Quality |
| --- | --- |
| <1.05 1/1 | normal quality |
| 1.05–1.15 1/1 | good quality |
| <1.15 1/1 | very good quality |

The carbon molecular sieves produced according to the invention have a specific oxygen adsorptivity of >1.15 l/l.

SPECIFIC EXAMPLES

Example 1 (Comparative Example)

72 parts by weight bituminous coal with a particle size of 100% smaller 80 μm treated with air in the fluidized bed at 230° C. up to an oxygen content of 12 % by weight are mixed with 28 parts by weight coaltar pitch (soft pitch, softening point according to Krämer-Sarnow at 50°-55° C.) by adding 20 kg water/100 kg of solids (oxidized coaltar bituminous coal and coaltar pitch) at a temperature of 70° C. The mixture is formed in an extruder into cylindrical bodies having a diameter of 2 mm. These formed bodies are carbonized in a continuously running cylindrical rotary kiln, until a final temperature of 880° C. is reached. The carbonized product is subsequently activated with steam in a further cylindrical rotary kiln at a temperature of 810° C. The dwelling time is 65 min. The reaction gas contains 75% by volume steam. The activation is conducted so that an activation degree of 5% is achieved. The obtained activated goods is subsequently treated in a vibratory oven with benzene. Thereby a nitrogen-benzene mixture with 8% by volume benzene is passed in counterflow through the vibratory oven at 800° C. The characteristics of the resulting carbon molecular sieve can be seen in Table 1.

Example 2

66.7 parts by weight of the oxidized hard coal described in Example 1 are mixed with 6.7 parts by weight starch (Cerestar AJ 12891 produced by Cerestar company n Krefeld) and 26.6 parts by weight water and are then formed in the extruder into cylindrical bodies with a diameter of 2 mm. After being dried at 105° C., the formed bodies are carbonized and activated as in Example 1. The benzene treatment was performed in the vibratory oven, as described in Example 1. The very good characteristics of the carbon molecular sieve can be seen in Table 1.

Example 3

60 parts by weight of the oxidized hard coal described in Example 1 are mixed with 12 parts by weight of starch (Cerestar AJ 12891 produced by Cerestar company in Krefeld) and 28 parts by weight water and formed in the extruder into cylindrical bodies with a diameter of 2 mm. After a drying period at 105° C., the formed bodies are carbonized and activated as in Example 1. The benzene treatment is performed in a vibratory oven as described in Example 1. The very good characteristics of the carbon molecular sieve can be seen in Table 1.

TABLE 1

| | Examples | | |
| | Example 1 Comparative Example | Example 2 | Example 3 |
|---|---|---|---|
| Volume of charge (ml) | 200 | 200 | 200 |
| Desorbed gas amount (ml) | 490 | 490 | 466 |
| average O$_2$ concentration (% by vol.) | 40.8 | 50.8 | 52.2 |
| Relative volume (l/l) | 2.45 | 2.45 | 2.33 |
| Oxygen adsorption (l/l) | 1.00 | 1.24 | 1.22 |

We claim:

1. Process for producing carbon molecular sieves for the separation of oxygen and nitrogen, whereby finely ground hard coal particles are oxidized with air in a fluidized bed, then the coal is shaped after water and binders have been added and carbonized at temperatures up to 900° C., subsequently activated with steam at temperatures of 800°-900° C., and the preliminary product of low-level activation is treated with carbon splitting hydrocarbons at 750°-850° C.; characterized in that starch products obtained by reacting agglutinized starches with sulphamates are used as said binders.

* * * * *